Sept. 20, 1932. O. H. TRUMAN 1,878,029
UNDERGROUND EXPLORATION METHOD
Filed Aug. 15, 1929 3 Sheets-Sheet 1

Orley H. Truman
INVENTOR
BY W. E. Currie
ATTORNEY

Sept. 20, 1932.   O. H. TRUMAN   1,878,029
UNDERGROUND EXPLORATION METHOD
Filed Aug. 15, 1929   3 Sheets-Sheet 2

Orley H. Truman
INVENTOR

BY W. E. Currie
ATTORNEY

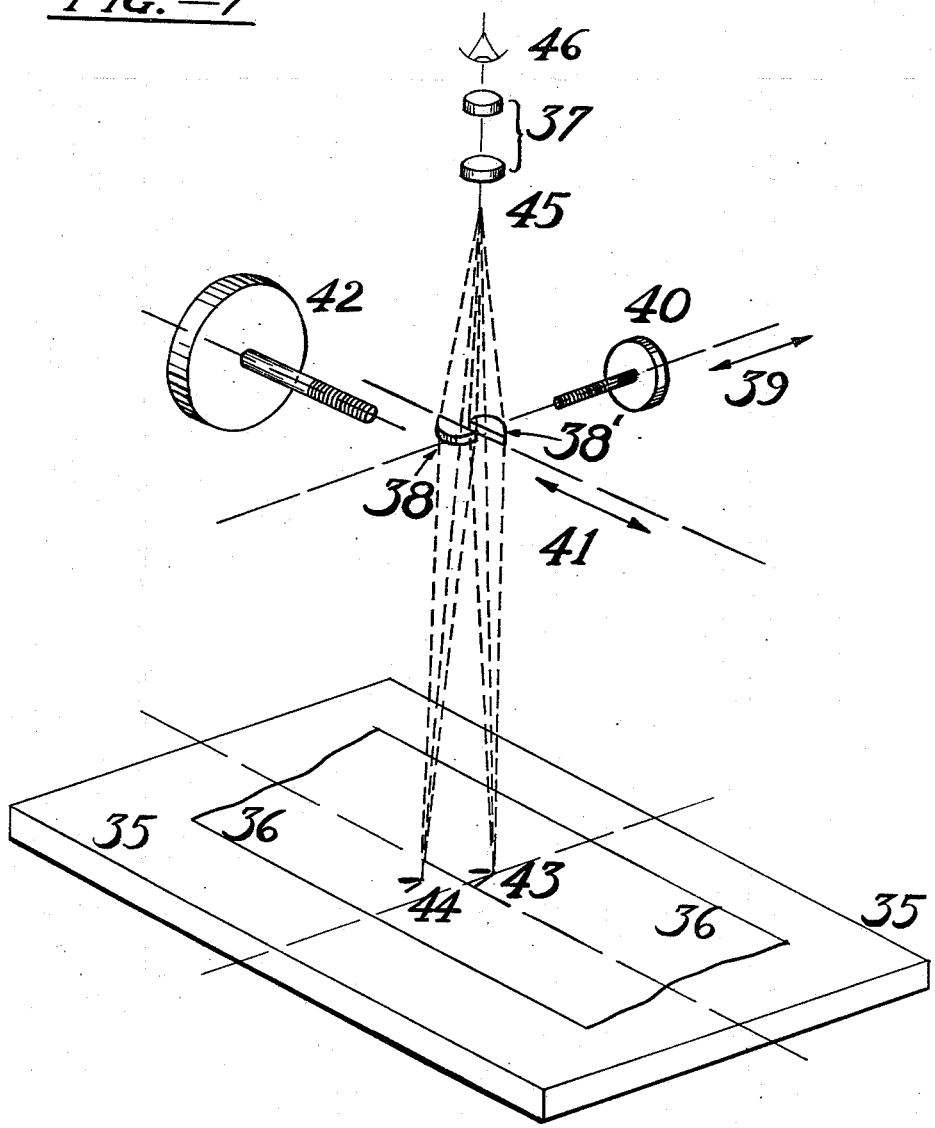

Patented Sept. 20, 1932

1,878,029

UNITED STATES PATENT OFFICE

ORLEY H. TRUMAN, OF HOUSTON, TEXAS, ASSIGNOR TO STANDARD OIL DEVELOPMENT COMPANY, A CORPORATION OF DELAWARE

UNDERGROUND EXPLORATION METHOD

Application filed August 15, 1929. Serial No. 386,046.

This invention may be looked upon as an improvement upon and a supplement to the invention covered in my pending United States patent application Ser. No. 334,340, filed January 22, 1929.

These inventions apply to that method of underground exploration which seeks to detect and locate underground structures by the elastic waves reflected from them, the waves being sent down from the surface by explosions. One obstacle to the success of these processes is the wave which comes directly from the source to the recording instrument, and frequently falls upon the reflected wave, obscuring it and making its beginning doubtful.

In my former application referred to above, I sought to remove this obstacle by using two receivers, so placed as to receive the direct wave in opposite phase, and so cancel it, while receiving the reflected wave nearly in the same phase, and so reenforcing it. This process will work in localities where the direct wave is sufficiently regular; but in many localities it is irregular, so that the annulling effect of one receiver upon the other is very imperfect.

I therefore propose to detect the deflected wave by a new method, which will succeed in many cases where the other fails. The manner of operation will be made evident from the following description and figures:

Fig. 7 is a diagrammatic view, in perspective, of a simple form of optical comparator, very useful in the process.

Figure 1:
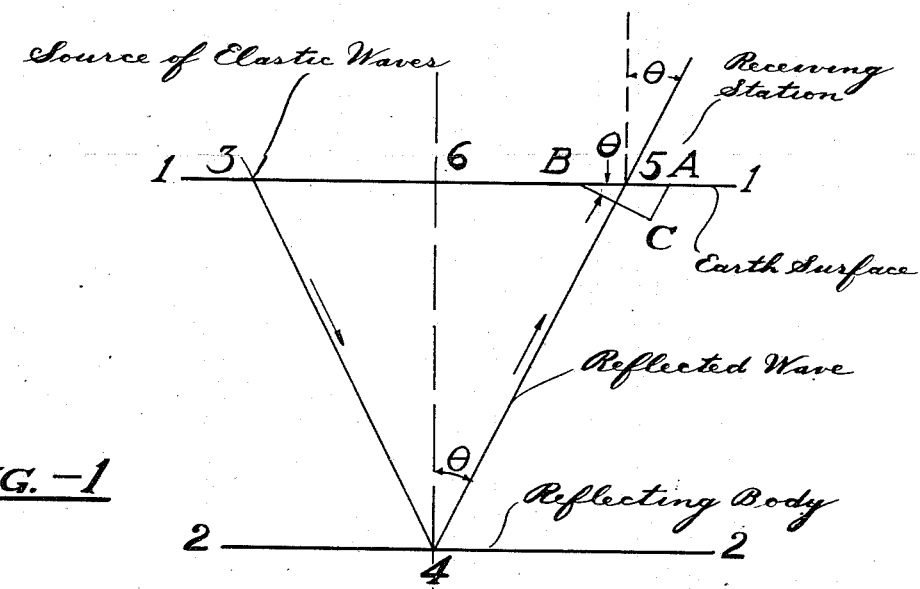
Fig. 1 is a general view to illustrate the principles involved.

Referring to Fig. 1, line 1—1 represents the surface of the ground, and 2—2 the top of a reflecting structure which it is desired to detect, and the depth of which is to be ascertained.

A charge of explosive being fired at 3, a train of waves from it will follow the path 3—4, be reflected at 4, and reach the surface at 5. A short portion of one of the waves of this train is represented by the line BC, making with the surface an angle $\theta$, equal to the angle which the line of travel, 4—5, makes with the vertical.

Now let $v_0$ be the true velocity of propagation of the wave through the earth, and $v$ be the apparent velocity along the surface. It is evident that the time consumed by the wave in moving from C to A will be $$T = \frac{AC}{v_0},$$

since CA is in the direction of wave travel. At the same time the wave will take time $$T = \frac{AB}{v}$$

to sweep along the surface from B to A. But as these times are obviously equal, we have $$\frac{AC}{v_0} = \frac{AB}{v},$$

whence $$\frac{AC}{AB} = \frac{v_0}{v}.$$

But $$\frac{AC}{AB} = \sin \theta$$

Hence we have $$\sin \theta = \frac{v_0}{v}.$$

Assuming for the moment that $v_0$ and $v$ are both known, $\sin \theta$ can therefore be found. If now point 6 is vertically above point 4, it is evident that Distance 4—6 = distance 6—5 (tan $\theta$) so that the depth of the reflecting stratum becomes known.

To find the depth, then depends upon knowing distance 6—5 and velocities $v_0$ and $v$.

Figure 5:
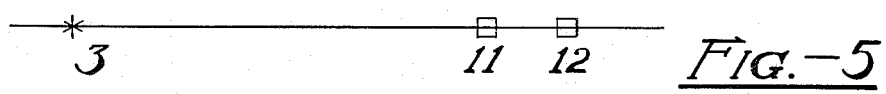
Fig. 5 is a plan view of the primary and most simple method of placing the receivers.
Figure 6:
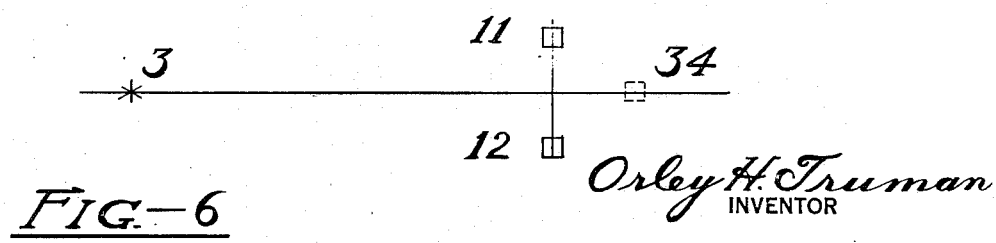
Fig. 6 is a plan view of two alternative methods of placing receivers.

As for distance 6—5, it is evident that when the reflecting layer may be assumed to be horizontal, as in Fig. 1, 6—5 is half the distance 3—5, and so is known at once.

Figure 2:
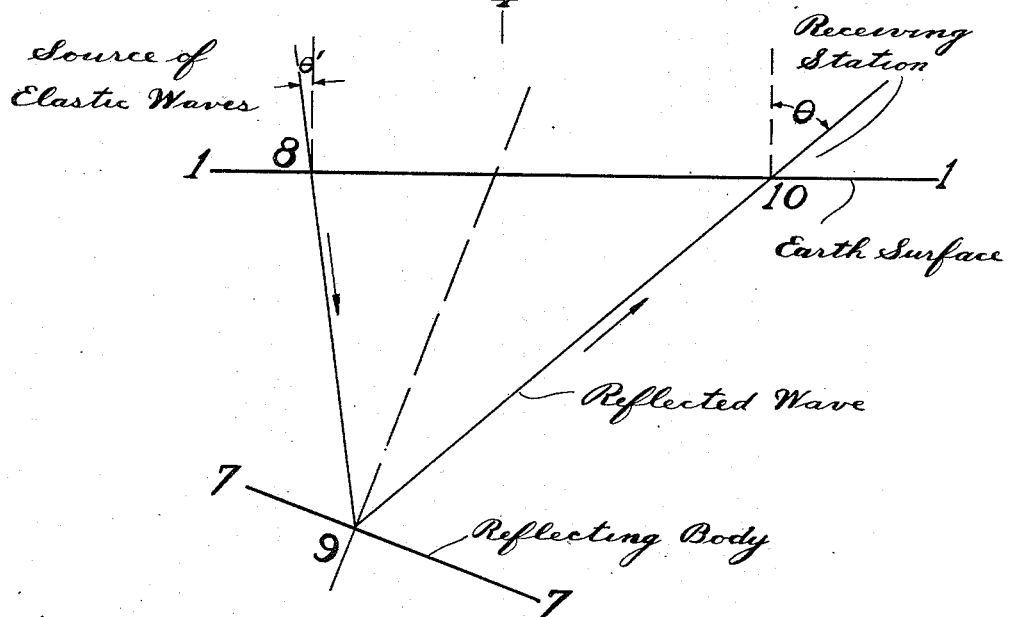
Fig. 2 illustrates an alternative case.

When this cannot be assumed, the method shown in Fig. 2 may be followed.

In that figure 1—1 is as before the surface of the ground, but the reflecting stratum 7—7 is sloping. Now assume that angle Θ can be found by firing a charge at 8 and receiving the waves at 10, after reflection at point 9. Then angle Θ' can equally well be found, by firing a charge at 10 and receiving the waves at 8, after reflection at point 9. Distance 8—10 and angles Θ and Θ' all being then known, the whole can be laid off on a scale drawing, and location of point 9, together with slope of stratum 7—7, found. All this will require no further explanation to those skilled in the art.

Figure 3:
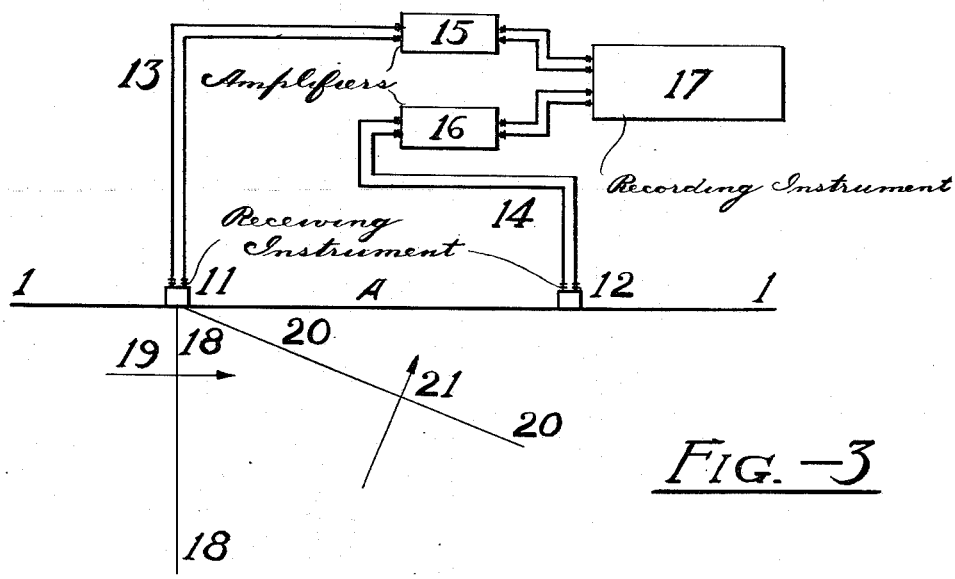
Fig. 3 is a diagrammatic view of the apparatus.

It is therefore apparent that the essential is to find the angles Θ, which in seismographic literature are called the "angles of emergence." This can be done with rapidity and accuracy as follows:

Referring to Fig. 3, 1—1 is as before the surface of the earth, along which pass waves such as 18—18, with fronts perpendicular to the surface, and with velocities $v_o$ in direction of arrow 19; and waves such as 20—20, with fronts not perpendicular to the surface, with velocities again equal to $v_o$ in directions perpendicular to their wave fronts, such as arrow 21, but with velocities along the surface $$v = \frac{v_o}{\sin \theta},$$

as before.

On the surface, or at a depth beneath it which will commonly be small, are placed two receivers 11, 12 of any type capable of converting mechanical vibrations into fluctuations of an electric current. These may be electric seismographs, microphones of either the carbon grain, magneto-electric, or condenser type, piezo-electric crystals, or any other device capable of fulfilling the above purpose. These are connected to an oscillograph 17 by wires 13, 14, so as to make a record from each receiver on the paper or film in the oscillograph, in the well known way. Vacuum tube amplifiers, 15, 16, will usually be inserted between the receivers and the oscillograph.

Figure 4:
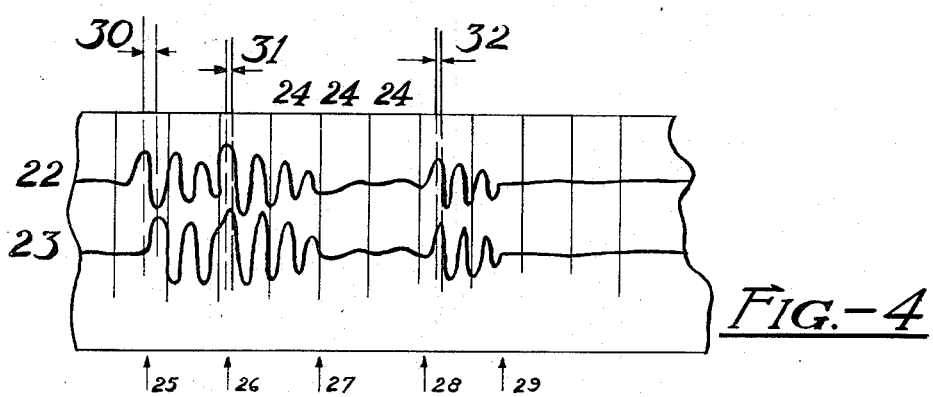
Fig. 4 is a typical record.

The oscillograph will now be found to produce a record essentially like Fig. 4. Here 22 is the record from receiver 11 and 23 that from receiver 12. Some kind of time marks, 24, 24, 24, made at equal intervals of time apart, are placed upon the record.

It is now seen that in the group of waves first arriving, 25 to 26, those in record 23 lag behind those in record 22 by a considerable amount, as shown at 30; but in the group of waves arriving second, 26 to 27, and in that arriving third, 28 to 29, the lag is by a less amount, shown at 31 and 32, respectively.

Now as these measured distances on the records, 30, 31, 32, may be easily translated into times by the time marks 24, 24, the times required by the various groups of waves to cover the known distance A from receiver 11 to receiver 12 are known, and the velocities are easily found. It is evident that the velocity of the first group will work out considerably lower than that of the other two, since the time it took was greater.

Now the velocity of the first group is the velocity $v_o$ shown by arrow 19 in Fig. 3; for the waves which have traveled by the shortest path, directly along the surface, will arrive first. The velocities of the second and third groups, which will generally be two groups of reflected waves, will be $v$. From each $v$, two in number in this case, and $v_o$, the appropriate values of $\theta$ are to be found and used as above described. In a case such as this when two trains of reflected waves appear, they may be either reflected from different formations, or from the same formation, the second reflected group in that case having traveled from the surface down to the formation and back twice. The occurrence of this performance may be known, apart from other evidence, and deception avoided, by the depth worked out from the second reflected group being very nearly twice that from the first.

In the preceding cases it has been assumed that the reflecting stratum was so placed that the reflected wave traveled in a plane perpendicularly to the surface of the ground, these cases being shown in side elevation in Figs. 1, 2, and 3. When it may be assumed that the stratum is so placed, the receivers should be placed as shown in plan in Fig. 5, in the same straight line with the shot 3.

But where it is not certain that the above is the case, they should at times be placed equally distant from the shot, as shown at 11, 12, Fig. 6, where again 3 is the shot. In that way the inclination to the vertical of what might be called the plane of wave travel can be found.

As this placing would at the same time lose the information to be gained from the placing of Fig. 5, I propose in many cases to use more than two receivers, so that all the possible information may be obtained from one shot and one record. The simplest number is three, placed as shown in Fig. 6. It is now evident that if all three record on a single oscillograph film, the records from 11 and 12 will give the inclination of the plane of wave travel to the vertical, while these combined with that from 34 will give the direction of travel in that plane.

The distance between the receivers will vary with circumstances. If too great, the waves from the different receivers will differ too much to be recognized as the same; if too small, errors in measurement of the distances 30, 31, 32, Fig. 4, will have too great an effect.

To cut these errors of measurement to a minimum, it is best to have some means of measuring the record by which the waves of one line, 23 in Fig. 4, say, are optically displaced so as to fall, as nearly as can be judged, precisely upon those of the other line, 22, and then the displacement read. In this way the judgment is the most accurate; several independent measures of each distance can be made and averaged, if desired; and the record is not disfigured by pencil marks, etc.

A simple means of doing this is shown diagrammatically, and in perspective in Fig. 7. Here 35—35 is a base plate, on which is placed a record, partly shown at 36—36, similar to the one shown in Fig. 4. An ocular 37 of any common type is mounted in a rigid framework at a suitable distance above the base 35—35. Between the ocular and the record is placed an objective, which has been cut diametrically into two parts, 38 and 38'. The part 38' is mounted in a slide so as to be moved by a screw 40 to and fro in direction of arrow 39; the part 38 is likewise mounted in a slide, so as to be moved by a screw 42 to and fro in direction of arrow 41. Neither part is allowed any other movement than the above.

Screw 40 is of ordinary construction; but screw 42 should be a good micrometer screw, with graduated head, by which the displacement of part 38 from its neutral position can be accurately read.

Comparing now Figs. 7 and 4, let 43 in Fig. 7 represent the peak of a wave in train 22, Fig. 4; and 44, in Fig. 7, the peak of the corresponding wave in train 23, Fig. 4. By moving part 38' of objective by screw 40, and part 38 of objective by screw 42, the images of 43 and 44 may be brought together in the upper focal plane of objective, at 45. There they are viewed by the ocular 37 and eye at 46.

When the two images are brought into correspondence, the displacement, lengthwise of the record, of point 43 with respect to point 44, which corresponds to the distances 30, 31, or 32 in Fig. 4, can be accurately read by micrometer head 42. A number of readings of the same distance may be made, either by the same observer or different observers, without any reading being biased by those which have gone before.

In this method of comparison, too, the eye can take in all features of the two waves which will assist in forming a judgment of the best setting; and the tops and bottoms of each wave can be read, allowing a final result of great dependability.

It will be understood that I do not restrict this invention to the precise means of carrying it out above set forth, but merely present those as simple and suitable means, reserving also all others substantially equivalent thereto.

Also, while I have above contemplated the use of this method to determine the direction from which a reflected wave reaches a point of observation, it will be obvious that the method is equally useful in determining the direction from which a wave from whatever origin, and having pursued whatever course, reaches the point of observation. Information of great practical importance in the use of refracted or diffracted waves may be obtained by this means; and the use of the method for such purposes is made equally a part of this application.

I claim:

1. In a method of locating underground structures, the improvement which comprises sending out a train of waves, receiving the waves at a plurality of spaced stations, recording the indications at each station in a form which will indicate the time interval between waves of each wave train arriving at the several stations, computing the wave velocities from the so determined time intervals and the known distances between the stations, and from the resulting data determining the angle of emergence of the waves reflected from the underground structure.

2. Method according to claim 1, in which waves are received at spaced stations substantially equally distant from the source of waves, and also when the stations are more or less distant from the source of waves, whereby both the inclination of underground structure and the angle of emergence of the reflected wave may be determined.

3. In underground exploration processes using elastic waves, the method of determining the direction from which a wave train reaches a point of observation which consists in placing two or more receivers near the point of observation but at some distance from each other connecting these receivers to an oscillograph, so as to make separate records upon the same record strip, optically superposing these separate records, two by two, and measuring and comparing the mutual displacements of corresponding waves in the separate records, substantially as above described.

ORLEY H. TRUMAN.